United States Patent
Chu et al.

(10) Patent No.: US 6,728,308 B1
(45) Date of Patent: Apr. 27, 2004

(54) EXTENDING SYMBOL RATES AND SYMBOL RATE RE-NEGOTIATION FOR FACSIMILE MODEMS

(75) Inventors: Keith T. Chu, Laguna Niguel, CA (US); Sverrir Olafsson, Reykjavik (IS)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,369

(22) Filed: Sep. 30, 1999

(51) Int. Cl.$^7$ .................................................. H04B 1/38
(52) U.S. Cl. ........................ 375/222; 709/228; 709/233
(58) Field of Search ................................. 375/219, 220, 375/222, 229, 232, 350; 709/228, 233

(56) References Cited

U.S. PATENT DOCUMENTS

| | | | | |
|---|---|---|---|---|
| 5,513,212 A | * | 4/1996 | Bremer ........................ | 375/222 |
| 6,141,353 A | * | 10/2000 | Li .............................. | 370/465 |
| 6,374,288 B1 | * | 4/2002 | Bhagavath et al. ......... | 709/203 |
| 6,502,138 B2 | * | 12/2002 | Hindie et al. ............... | 709/221 |
| 6,570,911 B1 | * | 5/2003 | O'Mahony .................. | 375/222 |

OTHER PUBLICATIONS

*T.38 and the Future of Fax; The Emerging Standard for Real–Time Fax Over IP*, Dialogic WorldView, http://www.dialogic.com, pp. 1–10.

*ITU–T Recommendation T.38; Procedures for Real–Time Group 3 Facsimile Communication Over IP Networks*, International Telecommunication Union, Jun. 1998, pp. 1–23.

*ITU–T Recommendation V.34; Series V: Data Communication Over the Telephone Network*, International Telecommunication Union, Feb. 1998, pp., 1–82.

*ITU–T Recommendation V.8; Series V: Data Communication Over the Telephone Network*, International Telecommunication Union, Feb. 1998, pp., 1–13.

* cited by examiner

*Primary Examiner*—Amanda T. Le
(74) *Attorney, Agent, or Firm*—Akin Gump Strauss Hauer & Feld LLP

(57) ABSTRACT

Half-duplex mode in V.34 facsimile modems can be exploited using symbol rate re-negotiation to enhance performance and throughput. The enhancement is useful for facsimile servers and for facsimile transmission over Internet Protocol ("FAX-over-IP") network applications. Extending the modem's symbol rate from the current maximum of 3429 symbols per second standard to a higher rate of symbol transmission can quickly enhance throughput. The technique is useful for fast primary channel retrains and for situations in which symbol rates are to be reduced. The technique is also useful for changing the requested symbol rate with data rate negotiation in situations in which data rate selection for the new symbol rate may not be known.

28 Claims, 3 Drawing Sheets

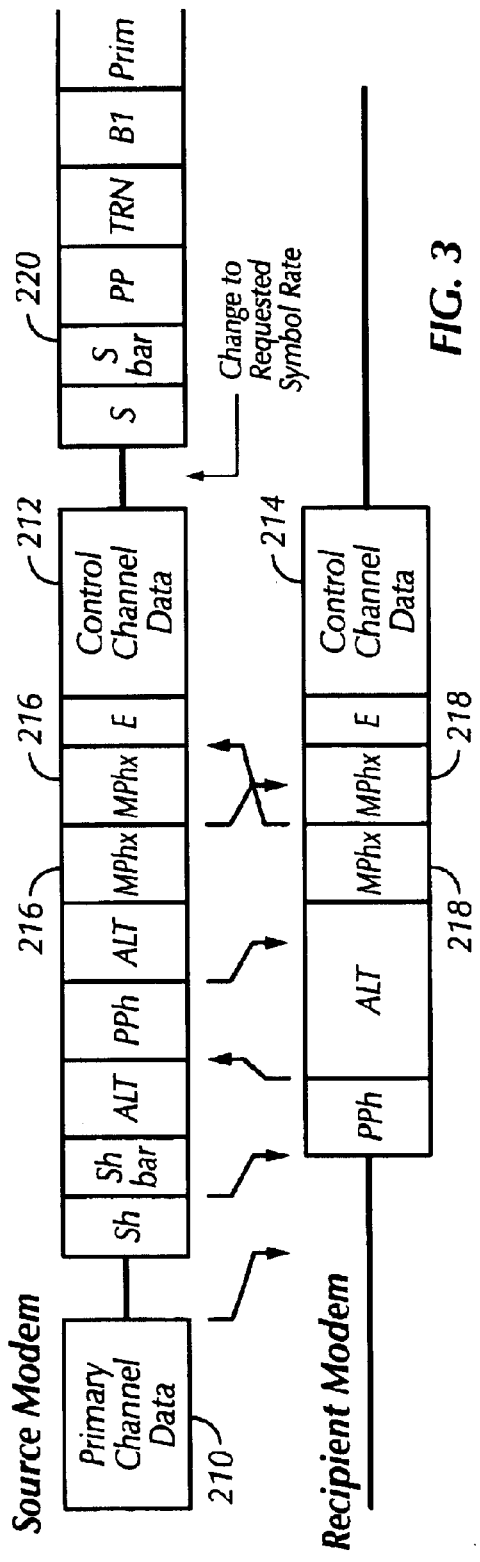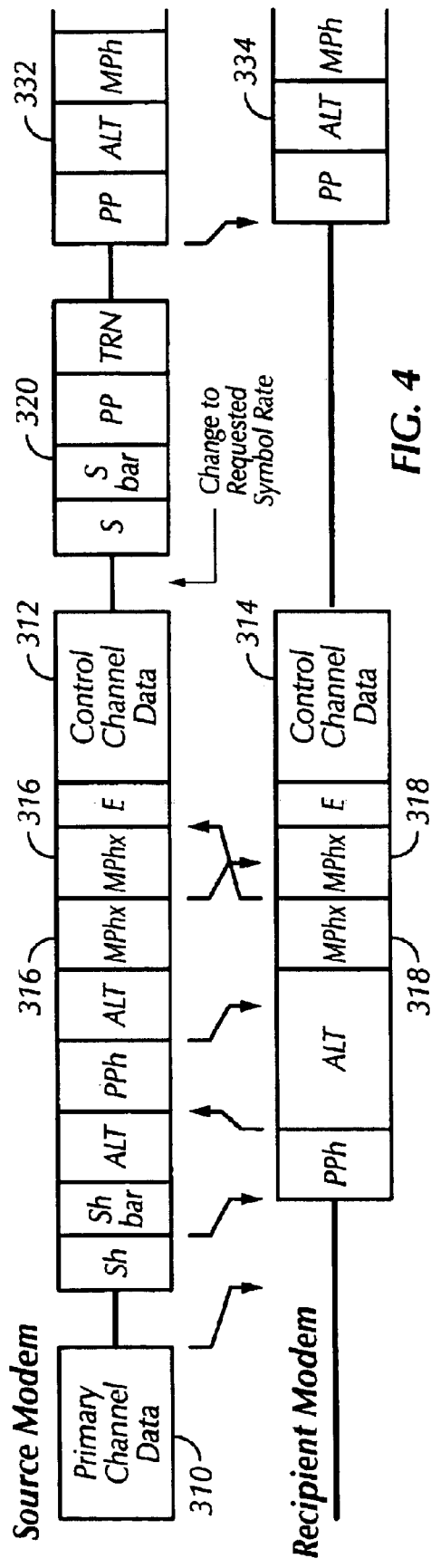

EXTENDING SYMBOL RATES AND SYMBOL RATE RE-NEGOTIATION FOR FACSIMILE MODEMS

BACKGROUND OF THE INVENTION

1. Field of the Invention

The invention relates to facsimile modems, and more particularly, enhanced throughput for facsimile modems operating in half-duplex mode.

2. Description of the Related Art

A modem (modulator-demodulator) is a communications device that employs digital modulation techniques to transmit binary data over analog band-limited communications channels. International Telecommunications Union-Telecommunication Standardization Sector (ITU-T) Recommendation V.34 is the standard for modems operating at data signaling rates up to 33,600 bits/s for use on the general switched telephone network and on leased point-to-point 2-wire telephone-type circuits.

A V.34 modem can operate in full-duplex (FDX) or half-duplex (HDX) mode. Half-duplex describes a mode of operation where exchange of data alternates between unidirectional transmission of primary channel data from source to recipient modem and simultaneous bidirectional transmission of control channel data between the two modems. The primary channel is the main data channel. Together with an optional auxiliary channel data, the primary channel constitutes the bitstream transmitted by the source modem. On the other hand, the control channel is used to exchange information between transmissions of primary channel user data, for example, for changing data signaling rates of the primary channel or the control channel, or exchanging of precoder coefficients.

V.34 modems support adaptive techniques that enable them to achieve close to the maximum data signaling rate the channel can support on each connection. Although the current V.34 modem standard supports a selectable symbol rate of up to 3429 symbols/s, the modem standard does not allow quick speed changes to be made in case of a wrong decision on symbol rate. The present invention is directed toward overcoming or at least reducing the effects of a wrong decision on symbol rate and other applications.

SUMMARY OF THE INVENTION

An executable code extension is made to current V.34 modems operating in half-duplex mode that enhances performance and throughput. The technique is useful for facsimile servers and for facsimile transmission over Internet Protocol ("FAX-over-IP") network applications, and the technique allows a compromise between bandwidth and noise performance to be made that optimizes the throughput of a V.34 modem over a given connection. The modem's primary channel equalizer can be trained to increase the selectable symbol rate from the current maximum of 3429 symbols per second standard to a higher rate of symbol transmission. The technique includes symbol rate re-negotiation and is useful for fast primary channel retrains and for situations in which symbol rates are to be reduced. The technique is also useful for changing the requested symbol rate with data rate negotiation in situations in which data rate selection for the new symbol rate may not be known.

In general, in one aspect, embodiments of the invention provide a modem that is configured, for facsimile operation, to change symbol rate. The modem includes a data pump and a memory device. The memory device is adapted to store, for facsimile operation of the modem, symbol rate re-negotiation code executable by the data pump for re-negotiating symbol rate for a connection with a second modem.

BRIEF DESCRIPTION OF THE DRAWINGS

A better understanding of the present invention can be obtained when the following detailed description of the preferred embodiment is considered in conjunction with the following drawings, in which:

FIG. 3 illustrates a control channel-to-primary channel transition that implements symbol rate re-negotiation in accordance with an embodiment of the invention; and FIG. 4 illustrates a control channel-to-primary channel transition that implements symbol rate re-negotiation in accordance with another embodiment of the invention.

DETAILED DESCRIPTION OF PREFERRED EMBODIMENT

Normal V.34 Modem Operation

Recommendation V.34 is incorporated by reference herein in its entirety. V.34 source and recipient modems use various well-known signals for a control channel restart when the recipient modem requests a change in modem parameters. These signals include:

J: A sequence of symbols generated by applying input bits to a scrambler that are used to request the constellation size to be used by a remote modem for transmitting other sequences during V.34 Phase 4 training;

$INFO_h$: A sequence used to exchange modem capabilities, results of line probing, and data modulation parameters;

Sh: A signal transmitted by alternating between point 0 of the quarter-superconstellation of FIG. 5 of Section 9.1 of the V.34 Recommendation and the same point rotated counterclockwise by 90 degrees, and used for control channel;

$\overline{Sh}$ (or Shbar): A signal transmitted by alternating between point 0 rotated by 180 degrees and the same point rotated counterclockwise by 270 degrees, and used for control channel;

ALT: A sequence consisting of scrambled alternations of binary 0 and 1 at 1200 bits/s that is transmitted using the control channel modulation with a differential encoder enabled and;

PPh: A sequence of four periods of an 8-symbol sequence used in half-duplex mode for control channel receiver initialization and resynchronization;

MPh: A modulation parameter sequence used for data mode transmission that is exchanged between modems during start-up and control channel synchronization and contains maximum source modem data signaling rate, control channel data signaling rate, trellis encoder choice, non-linear encoding parameter, amount of shaping, data signaling rate capability mask, asymmetrical control channel data rate enable, bits reserved for future use, and possibly fields for precoding coefficients;

E: A 20-bit sequence of scrambled binary ones used to signal the beginning of control channel user data;

S: Similar to Sh, but used for primary channel;

S̄ (or Sbar): Similar to S̄h, but used for primary channel;

PP: A sequence of six periods of a 48-symbol sequence used by a remote modem for training its primary channel equalizer;

B1: A sequence of one data frame of scrambled ones transmitted at the end of start-up using the selected data mode modulation parameters in which bit inversions for superframe synchronization are inserted as if the data frame were the last data frame in a superframe; and TRN: A sequence of symbols generated by applying binary ones to the input of a scrambler in which the scrambled bits are mapped to a 4- or 16-point 2D constellation depending on the signal J and are chosen depending on bit 30 of $INFO_h$.

Figure 1:
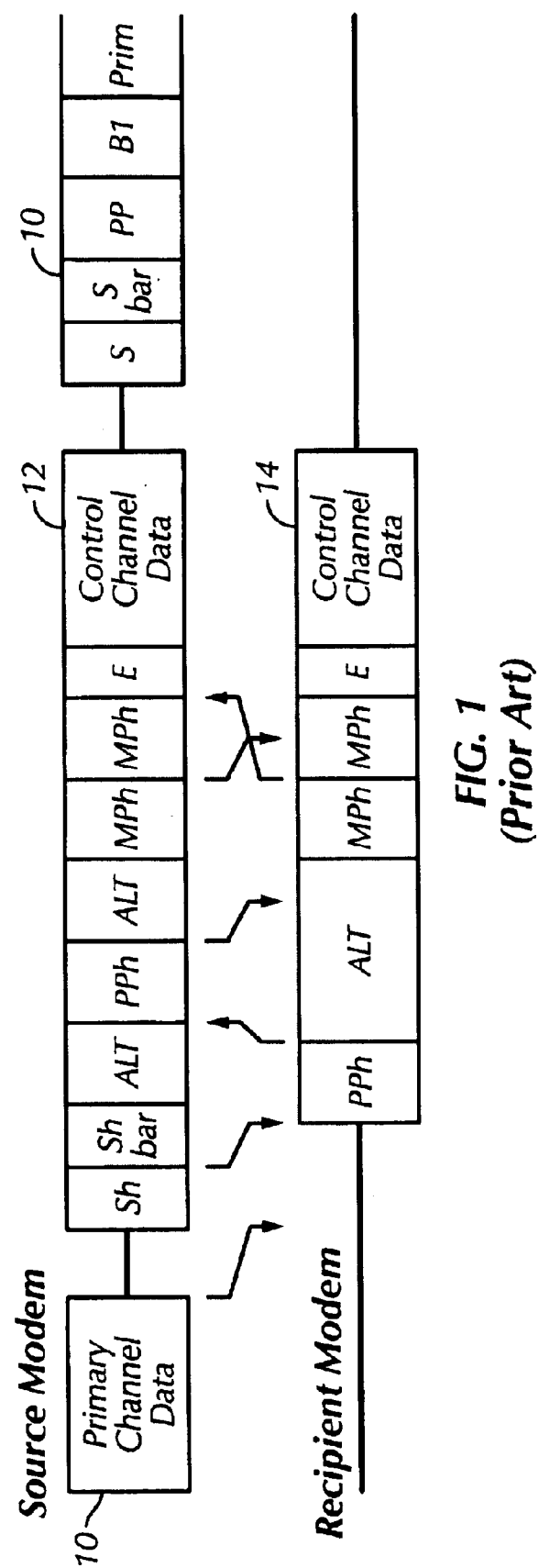
FIG. 1 illustrates the normal control channel-to-primary channel transition with a request for a primary channel data rate change.

V.34 modems implement procedures for initial training of the control channel and for restarting the control channel when the source modem or the recipient modem requests a change. FIG. 1 illustrates the normal control channel-to-primary channel transition protocol. In FIG. 1, the primary channel signal sequence, source modem control channel signal sequence, and recipient modem control channel signal sequence are designated primary channel signal sequence (or signal sequence structure) 10, source modem control channel signal sequence 12, and recipient modem control channel signal sequence 14, respectively. The recipient modem can, for example, request that a primary channel data rate change be implemented. A similar change can be implemented when the request is made by the source modem. Such requests require the primary channel equalizers in the source and recipient modems to be trained, which occurs in V.34 Phase 3 of the half-duplex start-up.

Focusing first on the source modem in FIG. 1, during the normal source modem control channel signal sequence 12, the source modem transmits silence for a period of time (typically 70±5 ms), and then transmits signal Sh (for 24T, where T is the control channel symbol time), followed by S̄h (for 8T). The source modem then conditions its receiver to detect signal PPh from the recipient modem (transmitted during the recipient modem control channel signal sequence 14) by transmitting ALT, followed by PPh, and then transmitting the ALT sequence again. On detection of signal PPh received from the recipient modem, the source modem transmits PPh followed by ALT. Once signal PPh is received by the source modem, the source modem sends MPh (typically within 120T). When the source modem has received at least one MPh sequence and the source modem is sending MPh sequences, the source modem completes the current MPh and sends a single 20-bit E sequence to the recipient modem. If the recipient modem has requested a primary channel data rate change, the request would be included in one of the MPh sequences transmitted during the recipient modem control channel signal sequence 14 and received by the source modem. At this time the source modem determines the data signaling rate for the primary channel such that the source modem's transmit rate will be the maximum rate enabled that is less than or equal to the data signaling rates specified in both modems' MPh sequences. After sending the E sequence, the source modem transmits user control channel data using the data signaling rate indicated in the MPh sequence transmitted by the recipient modem. After receiving the E sequence, the source modem receives control channel user data at the data signaling rate indicated in the MPh sequence sent by the source modem.

Focusing now on the recipient modem, as can be recognized from the above discussion, the recipient modem operates somewhat similarly to the source modem. During the recipient modem control channel signal sequence 14, the recipient modem first conditions its receiver to detect signal PPh from the source modem. After detecting signal PPh, the recipient modem transmits signal PPh, as shown in FIG. 1 and discussed above. The recipient modem then trains its primary channel equalizer using signal PPh, and conditions its receiver to receive MPh from the source modem. After the recipient modem transmits signal PPh, it transmits the ALT signal. The MPh signals are sent after this by the recipient modem; these signals can include the request for the primary channel data rate change. When the recipient modem has received at least one MPh sequence and the recipient modem is sending MPh sequences, the recipient modem completes the current MPh and sends a single 20-bit E sequence. At this point, the recipient modem determines the data signaling rate for the primary channel to be the maximum rate enabled that is less than or equal to the data signaling rates specified in both modems' MPh sequences. After sending the E sequence, the recipient modem transmits user control channel data using the data signaling rate indicated in the MPh sequence transmitted by the source modem. After receiving E, the recipient modem receives control channel user data using the data signaling rate indicated in the MPh sequence sent by the recipient modem.

Once the control channel data are complete, the procedure of V.34 Section 12.5 is followed for the transition back to the primary channel signal sequence 14. Focusing again on the source modem, as illustrated in FIG. 1, the source modem transmits silence to the recipient modem for some time (typically 70±5 ms), followed by S (for 128T, where T is the primary channel symbol time), and then by S̄ (for 16T). The source modem then transmits to the recipient modem the signal PP followed by the sequence B1. The source modem then enables transmission and transmits user data in the primary channel signal sequence 10 to the recipient modem.

Focusing now on the recipient modem, during the primary channel signal sequence 10, as illustrated in FIG. 1, the recipient modem conditions its receiver to detect both S and S̄ received from the source modem. The recipient modem then resynchronizes its receiver using the signal PP received. After receiving the sequence B1 from the source modem, the recipient modem enables and begins receiving user data from the source modem. At this point, any primary channel data rate change requested will have been implemented.

Enhanced V.34 Modem Operation

Many modem and computer connections are now going to servers that are digitally connected, and more are likely to in the future (e.g., facsimile transmission over Internet Protocol or "FAX over IP"). There is thus room for extending symbol rate while still using V.34 techniques, because when one side is digitally connected, there is only one conversion between digital and analog instead of two when both sides are connected analog through a digital network.

The trend is to use the slightly higher bandwidths available in modern networks, which can operate in V.34 FDX or V.34 HDX mode. Slightly higher performance of V.34 half-duplex operation over V.34 full-duplex operation is a promising prospect. One obvious advantage in half-duplex mode is that echoes on the connection do not pose a likely problem. Higher data rates and hence higher throughput on well-conditioned lines are possible.

Normal V.34 symbol rate changing procedures require a full retrain, which involves going back to Phase 2 of startup to do channel probing. Because channel probing has already been done in initial startup, doing it again does not provide any new information. Given that V.34 fax already has a control channel to negotiate data rates, it can be modified to also negotiate symbol rates, as described in more detail below.

Embodiments of the invention take advantage of HDX mode to enhance V.34 modem operation, yielding higher throughput. These embodiments are useful particularly for facsimile servers and for FAX-over-IP network applications. These embodiments enhance throughput by extending a modem's symbol rate from the current 3429 symbols per second standard to a higher rate of symbol transmission. Table 1 below is exemplary of the potential symbol rates and data rates that can be achieved.

TABLE 1

| Symbol Rate (Symbols per second) | Potential Data Rate (Bits per Second) | Comment |
|---|---|---|
| 3429 | 33600 | Current V.34 |
| 3692 | 36000/38400 | 9.75/10.4 bits/symbol |
| 3840 | 38400 | 10 bits/symbol |

Figure 2:
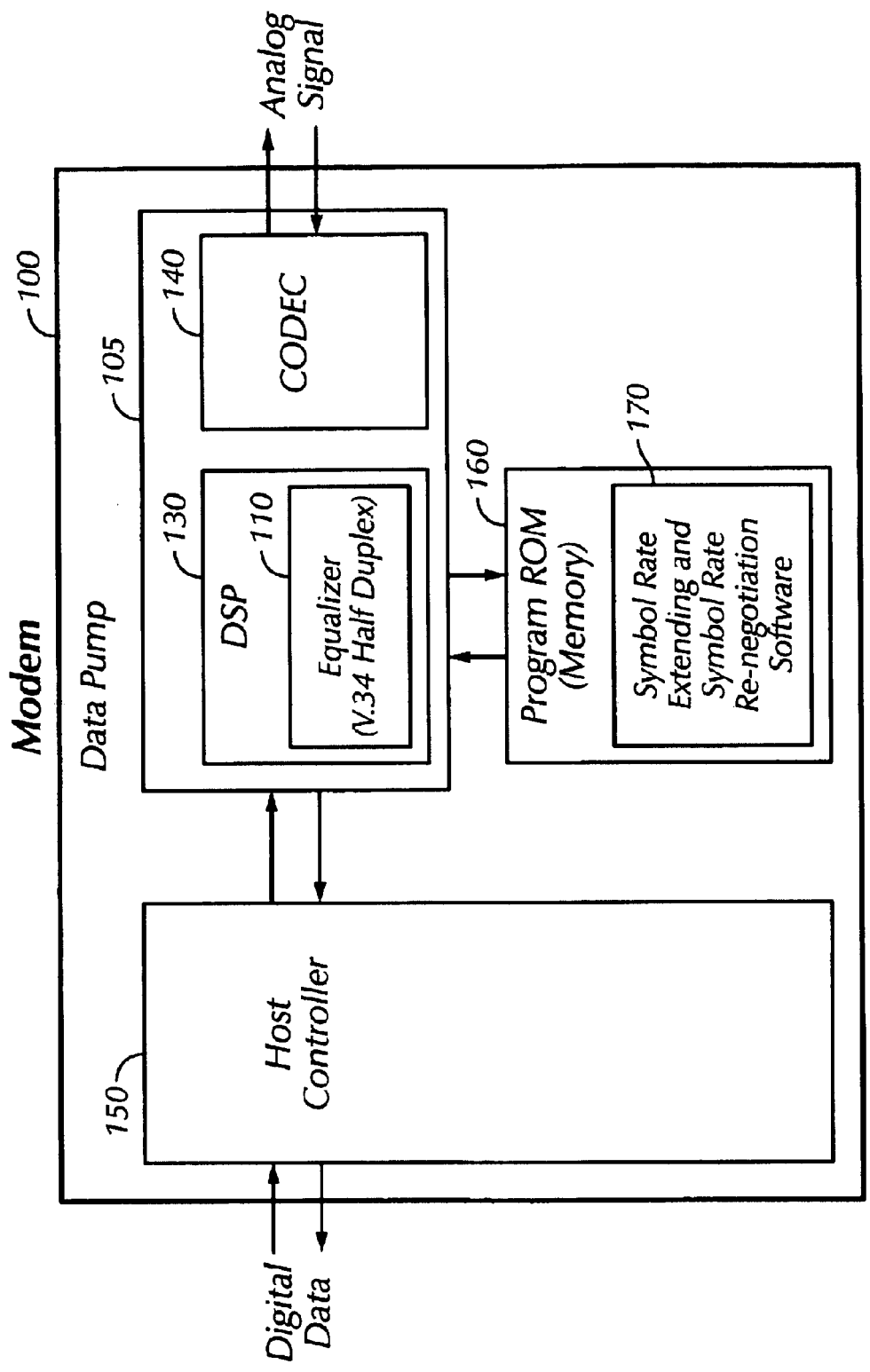
FIG. 2 illustrates a modem in accordance with an embodiment of the invention.

FIG. 2 shows components of a modem 100 (e.g., a data transmission modem) in which symbol rate can be extended and in which symbol rate re-negotiation can be implemented (i.e., symbol rate can be changed to another symbol rate, as described below), according to the present invention. Certain typical modem components have been omitted for sake of clarity and simplicity in the drawings. The modem 100 can receive and transmit analog signals across a telephone network through a communications channel (not shown). For example, the modem 100 can communicate with a remote modem that is digitally connected to the telephone network. Modulation during data transmission is quadrature-amplitude modulation (QAM). The modem 100 includes a data pump 105 that provides an adaptive primary channel equalizer 110 to compensate for channel distortion. The equalizer 110 can be implemented in a variety of conventional ways (both hardware and software). The equalizer 110, for example, can be a V.34 HDX equalizer. It should be appreciated by those skilled in the art that the communications channel also could be implemented in a variety of ways (e.g., telephone channels, radio channels, undersea channels, and the like).

The data pump 105 also includes a digital signal processor (DSP) 130 and a coder-decoder (CODEC) 140. Although the equalizer 110 is shown in FIG. 2 as part of the DSP 130, the equalizer function instead could be performed, for example, in a coprocessor associated with the DSP 130. Among other things, the DSP 130 converts digital data from a host controller 150 of the modem 100 into a digitized analog waveform or signal provided to the CODEC 140. The CODEC 140 converts the analog signals to digital signals and vice versa. If the modem 100 is a source modem, primary channel data and source modem control channel signals are routed through the CODEC 140 before being transmitted to a recipient modem. Control channel signals received by the source modem from a recipient modem are also routed through the CODEC 140. On the other hand, if the modem 100 is a recipient modem, the modem 100 receives both primary channel data and source modem control channel signals and transmits recipient modem control channel signals, all of which are routed through the CODEC 140. The DSP 130 and the CODEC 140 cooperate in a conventional manner. Design and operation of data pumps are known in the art.

The modem 100 can represent a variety of modems, including a V.34 modem or fax modem. It should be appreciated by those skilled in the art that the particular modem and modem architecture shown in FIG. 2 is merely illustrative and not exhaustive. It also should be appreciated by those skilled in the art that the modem can be implemented in a variety of ways (e.g., PC card or modem box, HDX or FDX fax modem, cable modem, wireless modem, and the like).

FIG. 2 additionally shows a memory device (or processor readable medium) 160 coupled to the DSP 130. The memory device 160 is readable by the DSP 130. The DSP 130 executes software or code 170 stored in the memory device 160. The memory device 160, which, for example, can be a programmable read-only memory (PROM), stores the software 170 used to extend symbol rate and to provide symbol rate re-negotiation using the modem 100. These techniques are described below in connection with FIGS. 3 and 4. It should be appreciated by those skilled in the art that these techniques are not limited to a specific implementation for extending symbol rate and for symbol rate re-negotiation in the software 170. While the software 170 is shown in the context of the modem 100 in FIG. 2, these techniques are applicable to other communications systems and devices supporting the V.34 Recommendation, which should be appreciated by those skilled in the art. Further, in place of or in addition to the memory 160, all or some of the software 170 instead could be stored in downloadable RAM for execution by the DSP 130. Also, as shown in FIG. 2, the memory device 160, the data pump 120, and the equalizer 110 can be provided in a single integrated circuit or chip.

With the software 170, the versatility of selecting symbol rates can be improved while allowing the symbol rates to be changed during a modem connection, if warranted by circumstances. This introduces the concept of symbol rate re-negotiation referenced above. For example, if an extended symbol rate of 3600 were chosen, but such operation proved inefficient, impractical, impossible, or resulted in decreased throughput due to actual performance (e.g., noise), then it would be possible to change (or re-negotiate) the symbol rate between source and recipient modems to a lower value to improve throughput. Likewise, symbol rate instead could be increased to increase throughput if warranted by circumstances, such as a low noise (e.g., a high signal-to-noise ratio) connection. Thus, symbol rate re-negotiation allows a compromise to be struck between bandwidth and noise performance to optimize the throughput of a modem, such as the modem 100, over a given connection.

In order to improve the reliability of symbol rate decisions, it is beneficial to extend the frequency range of the V.34 probing signal transmitted early on in the startup process (Phase 2). The V.34 Recommendation specifies a probing signal consisting of 21 tones at multiples of 150 Hz extending from 150 Hz to 3750 Hz (Table 17/V.34 Recommendation). As the extended symbol rates will generally introduce signal energy at frequencies well beyond 3750 Hz, and the channel attenuation may increase significantly at frequencies close to 4000 Hz, the addition of another probing tone above 3750 Hz will provide a useful indication of channel conditions in that frequency range. In keeping with the V.34 structure of using multiples of 150 Hz, adding a tone at 3900 Hz would be a suitable choice. The amount of energy detected at 3900 Hz during probing may then be used to predict performance at the extended symbol rates. For example, if the energy at 3900 Hz is significantly lower than at 3750 Hz, improved performance may be questionable. On the other hand, if the energy at 3900 Hz were within 5–10 dB of the energy at 3750 Hz, a performance increase would generally be achieved by increasing the symbol rate.

Exemplary embodiments in which symbol rate re-negotiation on V.34 HDX is implemented incorporate mechanisms within the V.34 HDX (source or recipient modem) control channel to indicate that a symbol rate re-negotiation is being requested, along with the required rate. On the next control channel-to-primary channel transition, rather than follow the procedures in V.34 section 12.5 outlined above, the modem (e.g., the modem 100) instead switches to a procedure similar to that described in Phase 3 of V.34 HDX. In contrast to FIG. 1, which involved a request for a primary channel data rate change, FIGS. 3 and 4 depict the revised procedures that implement the symbol rate re-negotiation in accordance with these exemplary embodiments. Symbol rate re-negotiation can be achieved in a variety of other ways, and is not limited exclusively to the embodiments shown in FIGS. 3 and 4, as will be appreciated by those skilled in the art having the benefit of this disclosure.

FIG. 3 illustrates a procedure for changing the symbol rate and possible data rate (fast retrain or symbol rate change) in a speedy manner, according to the invention. This procedure is useful for fast primary channel retrains and for situations in which symbol rates are to be reduced. A fast retrain can be a symbol rate re-negotiation without actually changing the rate. FIG. 3 shows a control channel-to-primary channel transition protocol that includes a primary channel signal sequence (or signal sequence structure) 210, a source modem control channel signal sequence 212, and a recipient modem control channel signal sequence 214. Signals in FIG. 3 are analogous to, and function the same way as, the signals shown in FIG. 1 having the same name and described above. In FIG. 3, MPhx 216, 218 are revised MPh sequences inserted into the control channel signal sequences 212, 214 that can include code-points for symbol rate re-negotiation. This would be a simple extension of the V.34 symbol-rate code-points, assigning one or more of the unused bit combinations for the new symbol rates. Here, one of the MPhx 218 sequences includes the code-points because the recipient modem is requesting symbol rate re-negotiation. A similar procedure could be followed with the MPhx 216 if the source modem instead requested the change. If the source modem detects the request from the recipient modem in the received MPhx 218 from the recipient modem to change the symbol rate to a new value, the source modem then transmits a primary channel train sequence 220 (to train the recipient modem's primary channel equalizer) based upon the new required symbol rate. The primary channel train sequence 220 is similar to that in Phase 3 of the modem start-up of V.34 Recommendation, Section 12.3, and to the description given above with reference to FIG. 1. The exception is the concatenation of the B1 (scrambled binary 1's) after the TRN and then the transition directly into primary channel data in the primary channel signal sequence 220. After the train sequence 220, the primary channel data rate could be modified, if need be, with the regular MPh exchange, as in FIG. 1. That is, a source modem control channel signal sequence phase like the source modem control channel signal sequence 12 of FIG. 1 would follow (i.e., with MPh, not MPhx) to allow the exchange of the new primary channel data rate. Later symbol rates can be negotiated from previous symbol rates using the control channel, and data transmission would resume using the later symbol rate without another channel probing phase. This same technique could be used for a fast primary channel retrain by simply negotiating the symbol rate to be the same as the previous symbol rate. The change to the requested symbol rate occurs during the period of silence (typically 70±5 ms) transmitted by the source modem in the transition from the control channel 212 to the primary channel train sequence 220, as indicated in FIG. 3.

FIG. 4 illustrates a procedure for symbol rate change with data rate negotiation useful in case data rate selection for the new symbol rate may not be known, according to the invention. The embodiment of FIG. 4 is similar to that of FIG. 3. FIG. 4 shows a control channel-to-primary channel transition protocol that includes a primary channel signal sequence (or signal sequence structure) 310, a source modem control channel signal sequence 312, and a recipient modem control channel signal sequence 314. Signals in FIG. 4 are analogous to, and function essentially the same way as, the signals shown in FIGS. 1 and 4 having the same name and described above. During the control channel signal sequence 312, 314, the appropriate setting of a code-point in MPhx 316, 318 makes the change request. Here, one of the MPhx 318 sequences includes the code-points because the recipient modem is requesting symbol rate re-negotiation. A similar procedure could be followed with the MPhx 316 if the source modem instead requested the change. Following the source modem control channel signal sequence 312, the source modem transmits the same primary channel Phase 3 sequence 320 (to train the recipient modem's primary channel equalizer) as described in Section 12.3 of the V.34 Recommendation, but based upon the new required symbol rate. The change to the requested symbol rate occurs during the period of silence (typically 70±5 ms) transmitted by the source modem in the transition from the source modem control channel signal sequence 312 to the primary channel sequence 320, as indicated in FIG. 4. Signal quality can be measured during TRN reception at the recipient modem and used to determine the new optimum data rate for the new symbol rate. After the train sequence 320, another source modem control channel signal sequence phase 332 and another recipient modem control channel signal sequence phase 334 occur (both without MPhx) to allow the exchange of the primary channel data rate. Signal sequences 332 and 334 are different here than before in that they have MPh instead of MPHx, and are really equivalent to signal sequences 12 and 14, respectively, of FIG. 1. It should be appreciated by those skilled in the art that there are a variety of other techniques that could be used to accomplish the change in the requested symbol rate with data rate negotiation useful in situations in which data rate selection for the new symbol rate may not be known. These techniques are included in the scope and spirit of the present invention.

In summary, the two new procedures described above coupled with an enhanced symbol rate allow for improved throughput for modems, such as V.34 facsimile modems.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A modem configured to change symbol rate, comprising;
    a data pump; and
    a memory device adapted to store symbol rate re-negotiation code executable by the data pump for re-negotiating symbol rate for a connection with a second modem,
    wherein the symbol rate re-negotiation code comprises for optimizing a transmission throughout of the modem, depending on transmission bandwidth and noise performance.

2. The modem of claim 1, wherein symbol rate re-negotiation data is transmitted to the second modem as a portion of a modulation parameter sequence.

3. The modem of claim 2, wherein the portion comprises code-points.

4. The modem of claim 1, wherein the symbol rate re-negotiation code is used for fast primary channel retrains and in situations in which symbol rates are to be reduced.

5. The modem of claim 1, wherein the symbol rate re-negotiation code is used for changing a requested symbol rate with data rate negotiation in situations in which data rate selection for a new symbol rate may not be known.

6. The modem of claim 1, wherein symbol rate re-negotiation data is transmitted to the second modem in a control channel signal sequence.

7. The modem of claim 1, wherein symbol rate is changed prior to a primary channel phase of the first modem.

8. The modem of claim 1, wherein the data pump comprises an equalizer, and wherein the equalizer is adapted to be trained for a new symbol rate on execution of the symbol rate re-negotiation code.

9. The modem of claim 1, wherein the data pump further comprises a digital signal processor adapted to execute the symbol rate re-negotiation code for changing symbol rate.

10. The modem of claim 9, wherein the data pump further comprises a coder-decoder coupled to the digital signal processor and adapted to convert between analog data and digital data associated with changing symbol rate.

11. The modem of claim 1, wherein the memory device comprises ROM.

12. The modem of claim 1, wherein the memory device comprises downloadable RAM.

13. The modem of claim 1, wherein symbol rate can be changed to be greater than a standardized maximum symbol rate.

14. The modem of claim 1, wherein the code is exchanged between the modems according to a control channel-to-primary channel transition protocol.

15. An integrated circuit for use in a modem comprising:
a memory device adapted to be read by a data pump and to store symbol rate extending and symbol rate re-negotiation code for changing symbol rate,
wherein the symbol rate extending and symbol rate re-negotiation code comprises code for producing a modulation parameter sequence used for data mode transmission exchanged between the modem and a second modem during start-up and control channel synchronization, and
wherein the symbol rate extending and symbol rate re-negotiation code is configured for optimizing a transmission throughput of the modem, depending on transmission bandwidth and noise performance.

16. The integrated circuit of claim 15, wherein a portion of the modulation parameter sequence comprises code-points for re-negotiating symbol rate.

17. A method for changing symbol rate and possible data rate between modems operating in half-duplex mode, the method comprising:
inserting, in a control channel signal sequence, a request by one of the modems for a symbol rate change;
detecting the request in a second modem;
transmitting, by the second modem, a primary channel train sequence based on the new symbol rate; and
exchanging a primary channel data rate between the modems.

18. The method of claim 17, wherein the inserting comprises inserting code points.

19. The method of claim 17, wherein the inserting comprises inserting in a modulation parameter sequence.

20. A method for changing symbol rate with data rate negotiation between modems operating in half-duplex mode, the method comprising:
setting, in a first modem, a code-point in a modulation parameter sequence to make a symbol rate change request in a second modem;
transmitting, from the first modem to the second modem, the modulation parameter sequence;
transmitting, from the second modem to the first modem, a primary channel sequence based on a new symbol rate;
training a primary channel equalizer in the first modem to operate at the new symbol rate; and
exchanging primary channel data rate between the modems.

21. A modem apparatus for data transmission, comprising;
a data transmission modem adapted to initialize a data transmission session by interacting with a remote modem in a channel probing phase that includes:
a symbol rate negotiation phase for determining a first symbol rate,
an equalizer training phase at the first symbol rate, and
a data rate negotiation phase using a control channel,
wherein the data transmission modem and the remote modem are adapted to negotiate a later symbol ratio from a previous symbol rate using the control channel; and
wherein data transmission resumes using the later symbol rate without another channel probing phase.

22. The modem of claim 21, wherein modulation during data transmission is QAM.

23. The modem of claim 22, wherein the first and/or the later symbol rate is greater than a standardized maximum symbol rate.

24. The modem of claim 21, wherein the remote modem is digitally connected to the telephone network.

25. The modem of claim 21, wherein the data transmission is in half-duplex mode.

26. The modem of claim 21, wherein a fast retrain is performed by negotiating the later symbol rate to be the same as the previous symbol rate.

27. The modem of claim 21, wherein the data transmission using the second symbol rate is preceded by an equalizer training phase at the later symbol rate.

28. A method for a data transmission modern, the method comprising:
initializing a data transmission session by the data transmission modem interacting with a remote modem in a channel probing phase including:
a symbol rate negotiation phase for determining a first symbol rate,
an equalizer training phase at the first symbol rate, and
a data rate negotiation phase using a control channel;
negotiating, between the data transmission modem and the remote modem, a second symbol rate using the control channel; and
resuming data transmission using the second symbol rate without a second channel probing phase.

* * * * *

UNITED STATES PATENT AND TRADEMARK OFFICE
CERTIFICATE OF CORRECTION

PATENT NO. : 6,728,308 B1
DATED : April 27, 2004
INVENTOR(S) : Chu et al.

It is certified that error appears in the above-identified patent and that said Letters Patent is hereby corrected as shown below:

Column 10,
Line 29, replace "ratio" with -- rate --
Line 50, replace "modern" with -- modem --

Signed and Sealed this

Fourteenth Day of September, 2004

JON W. DUDAS
*Director of the United States Patent and Trademark Office*